United States Patent
Cheng et al.

(10) Patent No.: US 11,147,112 B2
(45) Date of Patent: Oct. 12, 2021

(54) EV2X MODE 3 OPERATION BASED ON ENB TUNNELING

(71) Applicant: QUALCOMM Incorporated, San Diego, CA (US)

(72) Inventors: Hong Cheng, Bridgewater, NJ (US); Sudhir Kumar Baghel, Hillsborough, NJ (US); Zhibin Wu, Sunnyvale, CA (US); Michaela Vanderveen, Tracy, CA (US); Junyi Li, Chester, NJ (US); Kapil Gulati, Dover, DE (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 16/255,594

(22) Filed: Jan. 23, 2019

(65) Prior Publication Data
US 2019/0281641 A1 Sep. 12, 2019

Related U.S. Application Data

(60) Provisional application No. 62/641,053, filed on Mar. 9, 2018.

(51) Int. Cl.
*H04W 76/12* (2018.01)
*H04W 72/12* (2009.01)
*H04W 4/40* (2018.01)
*H04L 12/24* (2006.01)
(Continued)

(52) U.S. Cl.
CPC .......... *H04W 76/12* (2018.02); *H04L 41/08* (2013.01); *H04W 4/40* (2018.02);
(Continued)

(58) Field of Classification Search
CPC .......................... H04W 76/12; H04W 76/14
See application file for complete search history.

(56) References Cited

U.S. PATENT DOCUMENTS

| 2017/0013640 A1 | 1/2017 | Loehr et al. |
| 2017/0331670 A1* | 11/2017 | Parkvall ............... H04J 11/0079 |

(Continued)

FOREIGN PATENT DOCUMENTS

| EP | 3416436 A1 | 12/2018 |
| WO | WO-2017122976 A1 * | 7/2017 ............ H04W 76/40 |

OTHER PUBLICATIONS

Chen S., et al., "Vehicle-to-Everything (v2x) Services Supported by LTE-Based Systems and 5G", IEEE Communications Standards, vol. 1, No. 2, pp. 70-76, XP011660738, ISSN: 2471-2825, DOI: 10.1109/MCOMSTD.2017.1700015, [retrieved on Jul. 25, 2017], Abstract, Figure 2, Section "Enhanced Resource Allocation Mechanism for LTE V2X in 3GPP", p. 74.
(Continued)

*Primary Examiner* — Jeffrey M Rutkowski
*Assistant Examiner* — Chae S Lee
(74) *Attorney, Agent, or Firm* — Qualcomm Incorporated

(57) ABSTRACT

An aspect of the present disclosure includes methods, systems, and computer-readable media for establishing, at a first UE, a network connection with a first BS of a first communication network, transmitting a scheduling request for communication resources in a second communication network by tunneling to a second BS of the second communication network through the first BS of the first communication network, receiving from the first BS via the network connection, in response to the scheduling request, information for configuring the first UE for communicating with a second UE, configuring the first UE using the received information, and transmitting, directly, a message to the second UE using the communication resources in the second communication network.

36 Claims, 8 Drawing Sheets

(51) Int. Cl.
  *H04W 76/14*  (2018.01)
  *H04W 92/20*  (2009.01)
  *H04W 88/08*  (2009.01)
  *H04W 88/02*  (2009.01)

(52) U.S. Cl.
  CPC ... *H04W 72/1215* (2013.01); *H04W 72/1289* (2013.01); *H04W 76/14* (2018.02); *H04W 92/20* (2013.01); *H04W 88/02* (2013.01); *H04W 88/08* (2013.01)

(56) References Cited

U.S. PATENT DOCUMENTS

| | | | | |
|---|---|---|---|---|
| 2018/0332585 | A1* | 11/2018 | Faurie | H04W 72/042 |
| 2018/0368191 | A1* | 12/2018 | Vutukuri | H04W 76/14 |
| 2019/0058981 | A1* | 2/2019 | Xu | H04W 72/087 |
| 2019/0089498 | A1* | 3/2019 | Pelletier | H04L 5/0053 |
| 2019/0239112 | A1* | 8/2019 | Rao | H04W 72/0406 |
| 2020/0107351 | A1* | 4/2020 | Lee | H04L 5/0053 |

OTHER PUBLICATIONS

International Search Report and Written Opinion—PCT/US2019/014933—ISA/EPO—dated Apr. 25, 2019.

Lien S., et al., "Vehicular Radio Access to Unlicensed Spectrum", Technical Report of Wireless Networking Group, Coordinated Science Laboratory; Dept. Electrical and Computer Engineering; University of Illinois at Urbana-Champaign, US, vol. 24, No. 6, Dec. 1, 2017 (Dec. 1, 2017), pp. 46-54, XP011675644, ISSN: 1536-1284, DOI: 10.1109/MWC.2017.1600400, [retrieved on Jan. 4, 2018], Section "3GPP V2X, LAA, and IEEE 802.11ax, PC5-based V2X Radio Access in 3GPP", p. 47 and 48.

NOKIA et al., "NR Control Plane Architecture Options for LTE-NR ATight Interworking", 3GPP DRAFT; R2-163511 NR Control Plane Architecture Options for L TE-NR ATight Interworking, 3rd Generation Partnership Project (3GPP), Nanjing, China; May 22, 2016, 5 pages, XP051104989, Retrieved from the Internet: URL:http://www.3gpp.org/ftp/Meetings_3GPP_SYNC/RAN2/Docs/ [retrieved on May 22, 2016], Section 3.0, Section 3.2.

* cited by examiner

EV2X MODE 3 OPERATION BASED ON ENB TUNNELING

CROSS REFERENCE TO RELATED APPLICATIONS

The current application claims priority to U.S. Provisional Patent Application No. 62/641,053 entitled "EV2X Mode 3 Operation Based on eNB Tunneling," filed on Mar. 9, 2018, the content of which is incorporated by reference in its entirety.

BACKGROUND

Aspects of the present disclosure relate generally to wireless communication networks, and more particularly, to apparatus and methods for enhanced vehicle-to-everything (eV2X) communication.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

When utilizing eV2X communication, a user equipment (UE) may communicate directly with other UEs via NR wireless communication technology. The radio resources used by the UEs may be allocated by a NR base station (BS), also known as a gNB. However, the UEs may not be able to connect to the gNB prior to utilizing eV2X communication. For example, the UE may not have a NR radio interface (Uu) link available for scheduling NR device-to-device interface (PC5) for vehicle-to-everything (V2X) communication. Without connecting to the UEs, the gNB may not be able to properly allocate radio resources to the UEs. Therefore, improvements in radio resource allocation may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure includes methods for establishing, at a first UE, a network connection with a first BS of a first communication network, transmitting a scheduling request for communication resources in a second communication network by tunneling to a second BS of the second communication network through the first BS of the first communication network, receiving from the first BS via the network connection, in response to the scheduling request, information for configuring the first UE for communicating with a second UE, configuring the first UE using the received information, and transmitting, directly, a message to the second UE using the communication resources in the second communication network.

An aspect of the present disclosure includes systems having a memory, a transceiver, and one or more processors being configured to perform the steps of establishing, at the first UE, a network connection with a first BS of a first communication network, transmitting a scheduling request for communication resources in a second communication network by tunneling to a second BS of the second communication network through the first BS of the first communication network, receiving from the first BS via the network connection, in response to the scheduling request, information for configuring the first UE for communicating with a second UE, configuring the first UE using the received information, and transmitting, directly, a message to the second UE using the communication resources in the second communication network.

An aspect of the present disclosure includes computer-readable media having one or more processors for executing code for establishing, at a first UE, a network connection with a first BS of a first communication network, transmitting a scheduling request for communication resources in a second communication network by tunneling to a second BS of the second communication network through the first BS of the first communication network, receiving from the first BS via the network connection, in response to the scheduling request, information for configuring the first UE for communicating with a second UE, configuring the first UE using the received information, and transmitting, directly, a message to the second UE using the communication resources in the second communication network.

Aspects of the present disclosure include methods for establishing, at a first BS of a first communication network, a network connection with a UE, receiving a scheduling request from the UE for communication resources in a second communication network, forwarding the scheduling request to a second BS of the second communication network, receiving, from the second BS, information for the UE to communicate with a second UE via the second communication network, and forwarding the information to the UE.

Aspects of the present disclosure include systems having a memory, a transceiver, and one or more processors being configured to perform the steps of establishing, at a first BS of a first communication network, a network connection with a UE, receiving a scheduling request from the UE for communication resources in a second communication network, forwarding the scheduling request to a second BS of the second communication network, receiving, from the second BS, information for the UE to communicate with a second UE via the second communication network, and forwarding the information to the UE.

Aspects of the present disclosure include computer-readable media having one or more processors for executing code for establishing, at a first BS of a first communication network, a network connection with a UE, receiving a scheduling request from the UE for communication resources in a second communication network, forwarding the scheduling request to a second BS of the second communication network, receiving, from the second BS, information for the UE to communicate with a second UE via the second communication network, and forwarding the information to the UE.

Some aspects of the present disclosure include methods for receiving, at a first BS in a first communication network, a configuration request for the first communication network from a UE, wherein the configuration request is relayed by a second BS in a second communication network and transmitting configuration information in response to the configuration request by tunneling to the UE through the second BS, wherein the UE is outside a coverage area of the first BS.

Some aspects of the present disclosure include systems having a memory, a transceiver, and one or more processors being configured to perform the steps of receiving, at a first BS in a first communication network, a configuration request for the first communication network from a UE, wherein the configuration request is relayed by a second BS in a second communication network and transmitting configuration information in response to the configuration request by tunneling to the UE through the second BS, wherein the UE is outside a coverage area of the first BS.

Some aspects of the present disclosure include computer-readable media having one or more processors for executing code for receiving, at a first BS in a first communication network, a configuration request for the first communication network from a UE, wherein the configuration request is relayed by a second BS in a second communication network and transmitting configuration information in response to the configuration request by tunneling to the UE through the second BS, wherein the UE is outside a coverage area of the first BS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
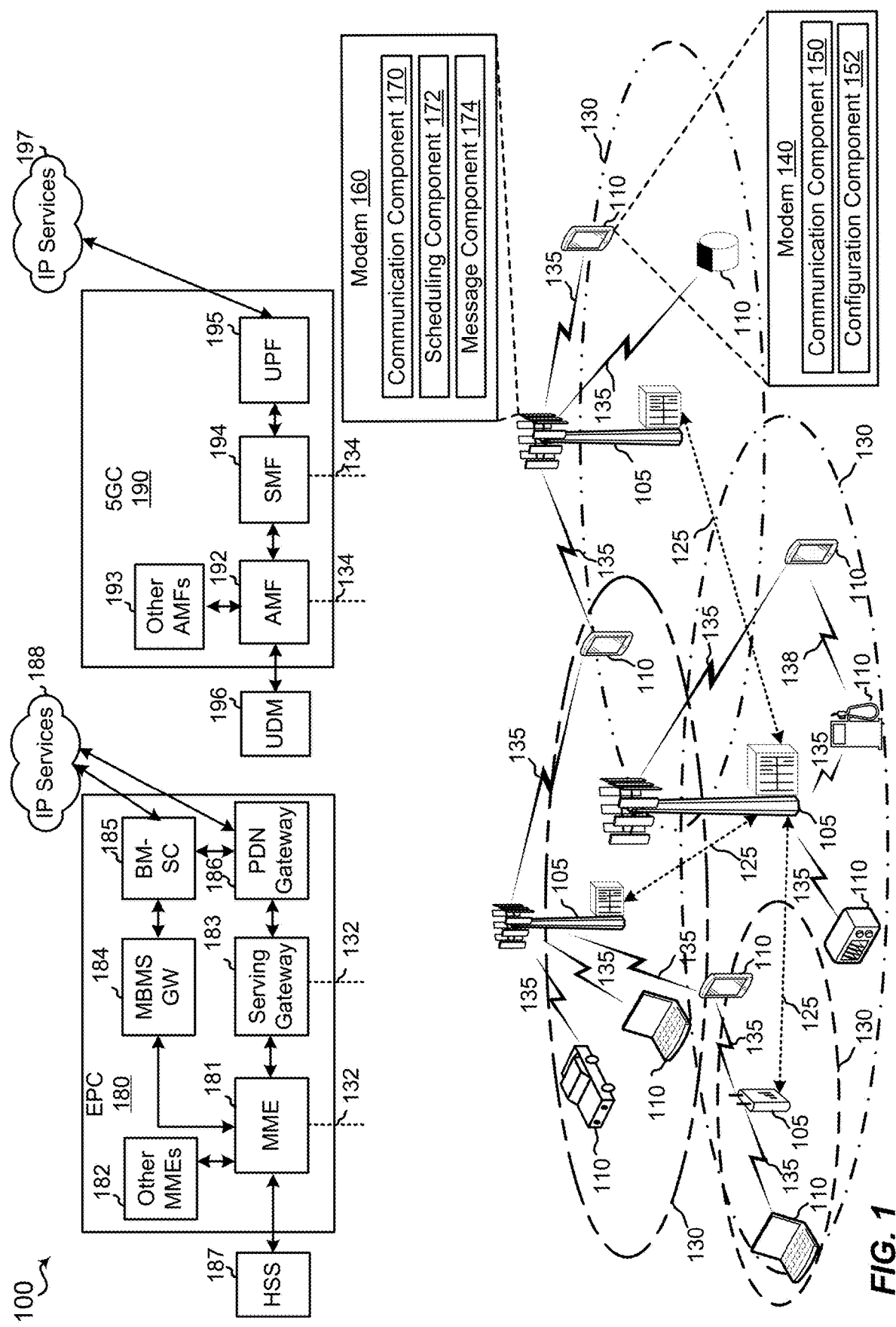
FIG. 1 is a schematic diagram of an example of a wireless communication network including at least one user equipment (UE)

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

A 5G eV2X UE (hereinafter referred to as "UE") may support both Long Term Evolution (LTE) vehicle-to-everything (V2X) and NR V2X radio. When the UE is under Evolved Terrestrial Radio Access Network (E-UTRAN) coverage, the network may configure the UE to use Mode 3 operation (i.e., scheduled resource allocation). Therefore, in order to operate V2X, the UE may use a BS, also known as an eNB, to schedule both the LTE PC5 V2X and NR PC5 V2X operations. This may be realized if the eNB has a connection with the gNB, i.e., to operate in dual connectivity (EN-DC) mode.

For NR PC5 Mode 3 operation, three protocols may be used: radio resource control (RRC) for the sidelink configuration of NR PC5 operation parameters and resources, media access control (MAC), such as buffer status report (BSR) for UE's scheduling request, and downlink control information (DCI-5) to indicate the scheduling assignment (SA) resource locations. The RRC and MAC layer messages may be tunneled via the LTE signaling toward a gNB to handle resources scheduling. The DCI-5 may be handled by an eNB by sending the information via enhanced physical downlink control channel (ePDCCH).

When the UE maintains an LTE connection with the eNB, the NR PC5 scheduling requests and/or configuration information for the V2X operations may be tunneled via the eNB to the gNB. By using the tunneling operation, the over the air (OTA) NR Uu connection between the UE and the gNB may not be established. Further, no OTA resources managed by the gNB are used for the NR PC5 operation because the NR V2X PC5 operations rely on tunneling for scheduling requests and/or configuration information. Further, the UE may be beyond the coverage of the gNB, and therefore, does utilize the OTA resources of the cell of the gNB when preparing for the V2X PC5 operations.

In some circumstances, tunneling operation may not be able to meet URLLC requirements for NR V2X operation due to delay. In the sidelink configuration, based on the X2 link quality (eNB-gNB), the UE may be configured on the quality of service (QoS) level upper bound (e.g. 5QI) for Mode 3 operation, and may be configured with Mode 4 (i.e. distributed scheduling) resources as well. If the communication requires QoS level beyond the upper bound, the UE may use the configured Mode 4 resources to operate in Mode 4.

In other implementations, the UE may enter into the coverage of a gNB, and the URLLC may be supported via a direct mode with the gNB (instead of tunnel operation). In other operation modes, e.g. when the UE goes out of the gNB coverage, a NR Uu link may be virtually established, but placed into INACTIVE mode OTA, and the gNB may perform scheduling via tunneled operation. Based on the UE mobility/measurement, the NR Uu link may be activated again when the UE enters the gNB coverage, and direct operation may be supported if URLLC level QoS is desired.

During the eNB tunneled scheduling for NR PC5 V2X Mode 3 operation, the eNB may broadcast certain information for NR PC5 operation in, for example, a system information block (SIB). In response, the UE may indicate, in the RRC configuration request (e.g. SLUEInfo) message whether to operate in LTE PC5 mode or NR PC5 mode. The NR PC5 configuration request (e.g., NR-SLUEInfo) may be embedded as a new Information Element (IE) within LTE SLUEInfo message. The eNB may forward the NR PC5 portion of the SLUEInfo message (e.g., NR-SLUEInfo) to the gNB. In response, the gNB may provide the corresponding configuration and prepares for the Mode 3 operation, and send the configuration information back to the eNB via a X2 interface. The eNB may include the response from the gNB as part of a RRCConnectionReconfiguration message together with the LTE PC5 configuration, and send to the UE. In the NR-SLUEInfo message, the UE may indicate for NR PC5 whether the UE wants normal transmission time interval (TTI), URLLC, or both. Along with this request, the UE may inform about the corresponding 5QI requirement. In the RRCConnectionReconfiguration message, the eNB may respond with permission for NR-PC5 resource request. Further, the message may also provide a NR V2X radio network temporary identifier (RNTI) for normal TTI and/or NR V2X RNTI for URLLC. The eNB may also provide logical channel identifier (LCD) mapping for normal TTI and URLLC to be used in BSR for NR PC5 V2X. Alternatively, the NR-SLUEInfo and NR-RRCReconfiguration messages may be sent to the UE as separate NR RRC messages tunneled via eNB, e.g. via Signaling radio bearer 1 (SRB1).

When requesting resources, the UE may send legacy BSR (e.g., existing BSR for LTE) to the eNB if the UE needs resource for LTE PC5 and the new BSR if the UE needs resource for NR V2X only or NR V2X and LTE simultaneously. The new BSR may be a BSR for LTE communication networks according to an aspect of the present disclosure, and includes both LTE BSR and NR-BSR. The new BSR may be used by the UE when requesting scheduling and/or configuration information for LTE PC5 communication, NR PC5 communication, or both LTE PC5 and NR PC5 communications. In the new BSR, the NR V2X portion may be embedded as an IE that will be forwarded to the gNB or, alternatively, the NR BSR may be added to the new LTE BSR as a transparent container to be forwarded to the gNB. The eNB may assign resources for transmission in enhanced physical downlink control channel e-PDCCH with a DCI-5 scrambled with NR V2X RNTI for TTI or NR V2X RNTI for URLLC, depending on which resource is assigned. The gNB may rely on the NR V2X portion of the BSR (or the NR-BSR) information to determine the resources allocated to the UE. Finally, the gNB may inform the eNB via X2 on the DCI-5 for the NR PC5 portion.

When addressing the potential tunnel delay, there are at least two options. One option is to support the tunneling operation, and the eNB guarantees a X2 high-speed link (or integrated gNB) between the eNB and the gNB. If the eNB cannot guarantee the high-speed link, the eNB may not indicate support of NR V2X mode 3 in SIB. Another option is that, during the configuration, e.g. in the RRCConnectionReconfiguration or NR-RRCReconfiguration messages, the gNB and/or eNB instructs the UE to use tunneled Mode 3 operation, e.g. by sending a BSR to the eNB, for up to a predetermined level of QoS that may be supported by the X2 link. A resource pool may be provided to the UE to operate in Mode 4 (without BSR) when the QoS needs exceed the level supported by using the X2 link.

In some circumstances, the UE may switch between INACTIVE and ACTIVE mode when moving into and out of the gNB coverage. When the UE is outside of the gNB coverage, the NR Uu link may be virtually established by the gNB, but placed into an INACTIVE mode. Here, the gNB will perform scheduling for NR PC5 V2X for Mode 3 operation via tunneled messages through the eNB. Further, the gNB may preserve some RACH-like resources for UE's V2X operation in case the UE comes back into the gNB coverage. The gNB may inform the UE of such RACH-like resources via the eNB or via the NR RRC message tunneled to the UE. When the UE reenters the gNB coverage, the UE sends a RRC message (e.g. SRB3) directly to the gNB to activate the NR Uu link via the pre-reserved resources to allow NR PC5 operation. Alternatively, the gNB may activate the pre-reserved resources based on an eNB indication (e.g. measurement reports or via NR RRC signaling tunneled in LTE SRB1).

In some implementations, when the UE is outside of the coverage of the gNB but within the coverage of the eNB, the UE and the gNB may communicate via the eNB by tunneling. In particular, the UE may rely on the tunneling operation to receive resources used for V2X communications with another device.

Referring to FIG. 1, in accordance with various aspects of the present disclosure, a wireless communication network 100 includes at least one UE 110 including a modem 140 with a communication component 150 configured to communicate with a BS 105, such as sending/receiving messages to the BS 105. The BS 105, for example, may be a gNB or eNB. The modem 140 may include a configuration component 152 configured to prepare the UE 110 for LTE or NR eV2X communication with another UE 110.

In some implementations, a modem 160 of the BS 105 includes a communication component 170 configured to transmit messages, e.g., configuration information, to the UEs 110. The modem 160 may include a scheduling component 172 that allocates radio resources for one or more UEs 110 to communicate via LTE or NR eV2X communication. The modem 160 may include a message component 174 that generates one or more messages including resource request and configuration information.

The modem 160 of a base station 105 may be configured to communicate with other base stations 105 and UEs 110 via a cellular network, a Wi-Fi network, or other wireless and wired networks. The modem 140 of a UE 110 may be configured to communicate with the base stations 105 via a cellular network, a Wi-Fi network, or other wireless and wired networks. The modems 140, 160 may receive and transmit data packets.

The base stations 105 and the UE 110 may communicate via a network having an Evolved Packet Core (EPC) 180 or a Fifth Generation Core (5GC) 190. The EPC 180 or the 5GC 190 may provide user authentication, access authorization, tracking, internet protocol (IP) connectivity, and other access, routing, or mobility functions. The base stations 105 configured for 4G LTE (collectively referred to as Evolved Universal Mobile Telecommunications System (UMTS) Terrestrial Radio Access Network (E-UTRAN)) may interface with the EPC 180 through backhaul links 132 (e.g., S1, etc.). The base stations 105 configured for 5G NR (collectively referred to as Next Generation RAN (NG-RAN)) may interface with the 5GC 190 through backhaul links 134. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate with each other directly or indirectly (e.g., through EPC 180 or the 5GC 190) over backhaul links 132, 134 (e.g., X2 interface). The backhaul links 132, 134 may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a LTE or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for EPC 180 or the 5GC 190 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 110 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. Some examples of IoT devices may include parking meter, gas pump, toaster, vehicles, and heart monitor. A UE 110 may be able to communicate with various types of base stations 105 and network equipment including macro eNBs, small cell eNBs, macro gNBs, small cell gNBs, relay base stations, and other network equipment.

In some implementations, the UE 110 may be a vehicle configured to communicate with other UEs 110, e.g. other vehicles, via V2X communication technologies.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The communication links 135 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

A base station 105, whether a small cell or a large cell (e.g., macro base station), may include an eNB, gNodeB (gNB), or other type of base station. Some base stations 105 may operate in a traditional sub 6 GHz spectrum, in millimeter wave (mmW) frequencies and/or near mmW frequencies in communication with the UE 110. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, and may also be referred to as centimeter wave. Communications using the mmW and/or near mmW radio frequency band has extremely high path loss and a short range. The mmW base station 105 may utilize beamforming with the UEs 110 to compensate for the extremely high path loss and short range.

In a non-limiting example, the EPC 180 may include a Mobility Management Entity (MME) 181, other MMES 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
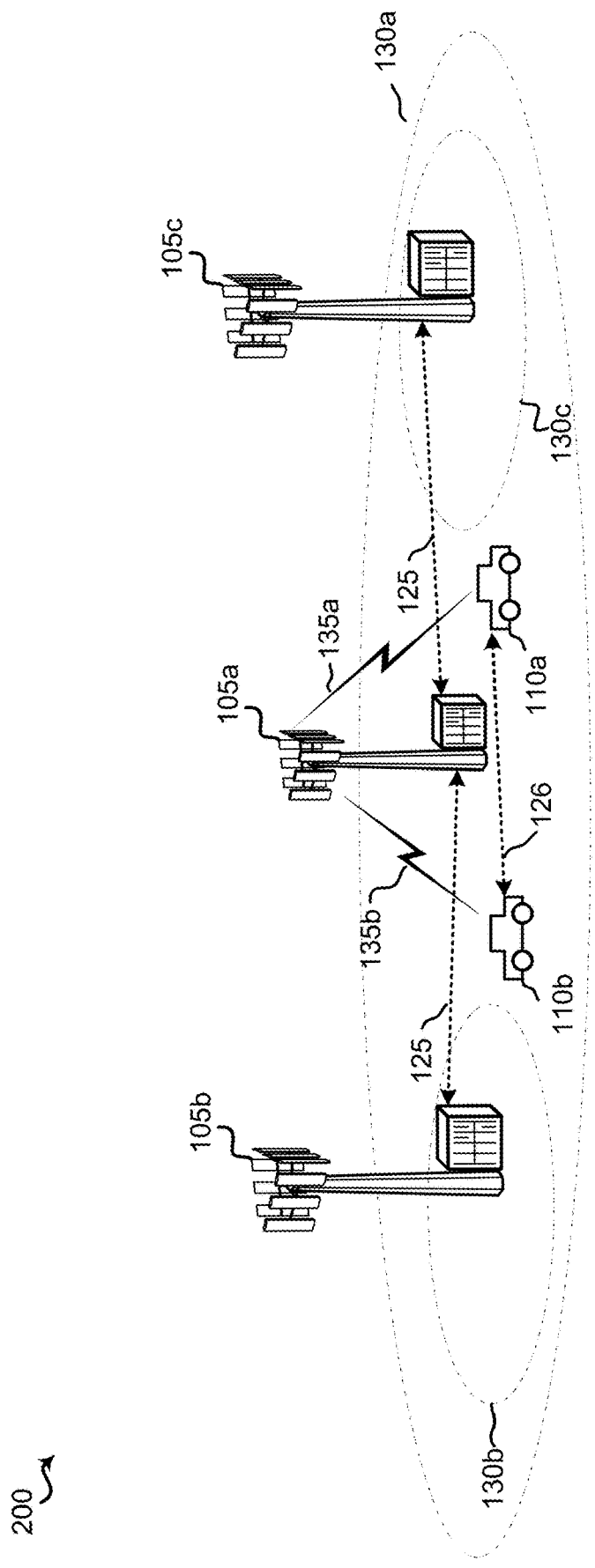
FIG. 2 is a schematic diagram of an example of a wireless communication network for tunneling resource requests for V2X communication.

Referring to FIG. 2, an example of a wireless network 200 includes an eNB 105a, a first gNB 105b, and a second gNB 105c. The eNB 105a may be a dual connectivity base station. The eNB 105a may communicate with the first gNB 105b and the second gNB 105c using backhaul links 125. In some examples, the backhaul links 125 may be X2 backhaul links that include wired and/or wireless communication links between the eNB 105a, first gNB 105b and the second gNB 105c. The eNB 105a, first gNB 105b, and the second gNB 105c each includes a coverage area 130a, 130b, 130c. The coverage area 130a, 130b, 130c may include regions around the eNB 105a, first gNB 105b, and the second gNB 105c within the transmission ranges of the eNB 105a, first gNB 105b, and the second gNB 105c, respectively. In some implementations, the coverage areas 130a, 130b, 130c may fully overlap, partially overlap, or include no overlap. The wireless network 200 also includes a first UE 110a and a second UE 110b. The first UE 110a and the second UE 110b may be vehicles configured to wireless communicate via a V2X link 126. The V2X link 126 may be a type of the D2D communication link 138. The first UE 110a and the second UE 110b may include hardware and software, such as the UE 110 in FIG. 6, for example, to communicate via the V2X link. The wireless network 200 may include a first wireless communication link 135a to enable the eNB 105a to communicate with the first UE 110a and a second wireless communication link 135b to enable the eNB 105a to communicate with the second UE 110b.

In certain examples, when the first UE 110a is outside the coverage area 130c of the second gNB 105c, which may prevent the first UE 110a from establishing a direct communication link with the second gNB 105c. To receive NR PC5 configuration information from the second gNB 105c, the first UE 110a may send a resource request via a tunneling operation, through the eNB 105a, and receive the configuration information via the tunnel from the second gNB 105c. The tunneling operation may provide an alternative path for data to be exchanged between the second gNB 105c and the first UE 110a that is outside the coverage area 130c. Specifically, the tunneling operation may include the eNB 105a relaying information between the second gNB 105c and the first UE 110a.

In certain implementations, the first UE 110a may wirelessly communicate with the eNB 105a via the first wireless communication link 135a. In some examples, the eNB 105a may broadcast information relating to NR PC5 operations in, for example, SIBs. Upon receiving the NR PC5 information, the first UE 110a may send a SLUEInfo message back to the eNB 105a indicating whether the first UE 110a wants to communicate with the second UE 110b via the LTE PC5 interface or the NR PC5 interface. If the first UE 110a requests radio resources for the LTE PC5 interface, the eNB 105a may allocate resources directly to the first UE 110a to communicate with the second UE 110b. If the first UE 110a requests radio resources for the NR PC5 interface, the first UE 110a may embed the NR PC5 configuration request (e.g. NR-SLUEInfo message) within the SLUEInfo message, and send the SLUEInfo message to the eNB 105a. The SLUEInfo message may function as a container to carry the NR PC5 configuration request. The SLUEInfo message may tunnel through the eNB 105a to reach the second gNB 105c via the procedure described below.

Upon receiving the SLUEInfo message from the first UE 110a, the eNB 105a may forward the NR-SLUEInfo message (including the NR PC5 configuration request) to the second gNB 105c. The NR-SLUEInfo message may also include information indicating that the first UE 110a requests for TTI or URLLC QoS. The eNB 105a may utilize the backhaul links 125 to transmit the NR PC5 configuration request.

When the second gNB 105c receives the NR-SLUEInfo from the eNB 105a, the second gNB 105c may provide the requested NR PC5 configuration information to the eNB 105a and prepare for Mode 3 operation. The second gNB 105c may utilize the backhaul links 125 to transmit the NR PC5 configuration information back to the eNB 105a.

When the eNB 105a receives the NR PC5 configuration information from the second gNB 105c, the eNB 105a may embed the NR PC5 configuration information into the RRCConnectionReconfiguration message, and send the message to the first UE 110a over the first wireless communication link 135a. The RRCConnectionReconfiguration message may include NR PC5 configuration information, LTE PC5 configuration information, NR V2X RNTI for TTI, NR V2X RNTI for URLLC and/or LCID mapping for TTI and URLLC. The LCID may be used in BSR for NR PC5 V2X.

In certain examples, the first UE 110a may transmit a RRC configuration request message (e.g., SLUEInfo) for the sidelink configuration of the NR PC5 operation parameters and resources and a MAC layer message (e.g. BSR) for the scheduling request to the second gNB 105c by tunneling through the eNB 105a. The first UE 110a may send a legacy BSR toward the eNB 105a when requesting radio resources for LTE PC5, and a new BSR when requesting radio resources for NR V2X PC5 only, or both NR V2X PC5 and LTE PC5 simultaneously. For example, the legacy BSR may include the LTE PC5 configuration request. The new BSR may include the NR PC5 configuration request, or both the LTE PC5 configuration request and the NR PC5 configuration request. The new BSR may be forwarded to the second gNB 105c by the eNB 105a over the backhaul links 125. The new BSR may be embedded as an IE or added in the LTE BSR as a transparent container prior to forwarding to the second gNB 105c.

The eNB 105a may assign resources for transmission in the PDCCH or the ePDCCH with a DCI-5 scrambled with the NR V2X RNTI for TTI or the NR V2X RNTI for URLLC. After the first UE 110a receives the information necessary for V2X communication, the first UE 110a may communicate with the second UE 110b through the V2X link 126.

Figure 3:
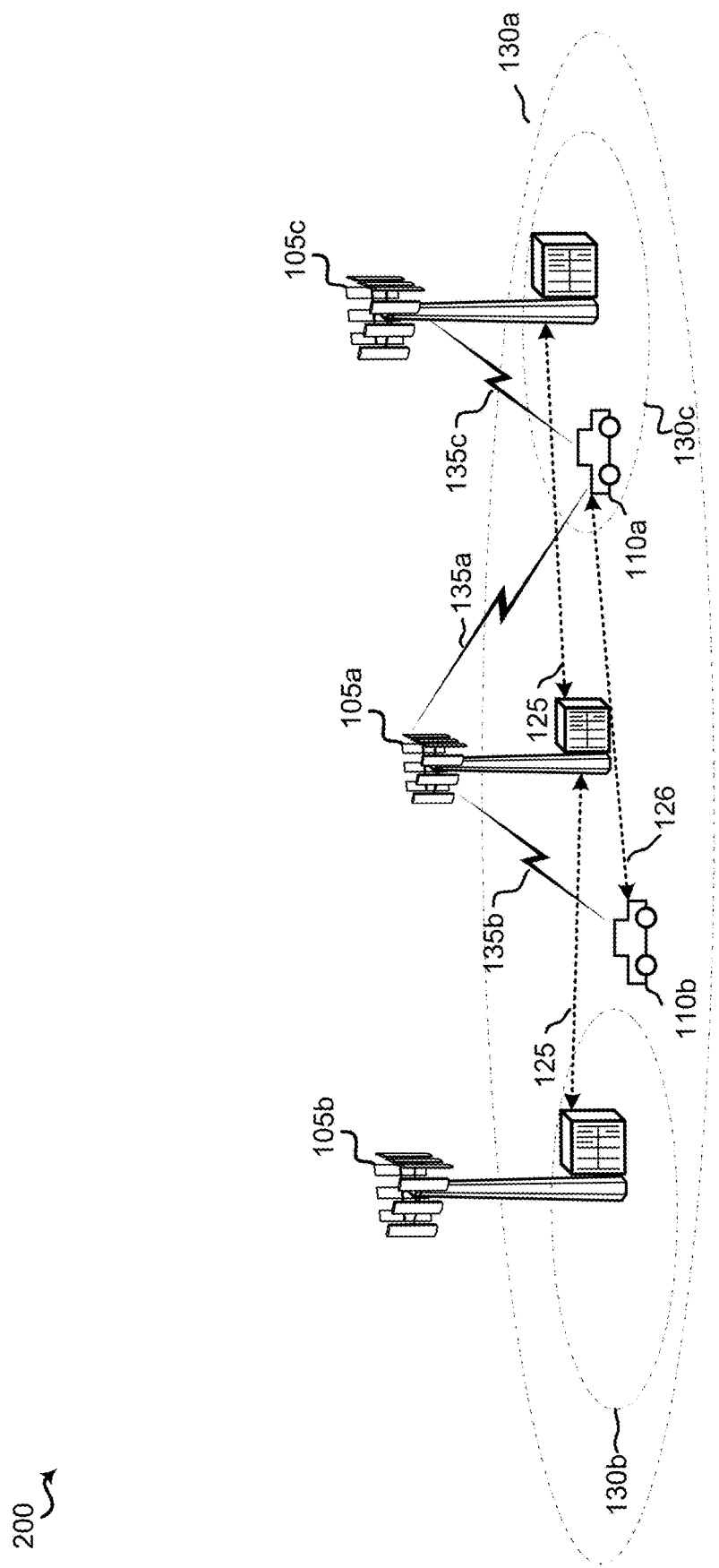
FIG. 3 is a schematic diagram of an example of a wireless communication network for V2X communication.

Turning now to FIG. 3, in some implementations, the first UE 110a may sporadically move into and out of the coverage area 130c of the second gNB 105c. Prior to moving into the coverage area 130c, a NR radio interface link 135c may be virtually established between the first UE 110a and the second gNB 105c, as described above. The NR radio interface link 135c may be placed into an INACTIVE mode. To perform scheduling of NR PC5 V2X for mode 3 operations with the first UE 110a, the second gNB 105c may still rely on tunneling through the eNB 105a to deliver messages containing configuration information, as described above in FIG. 2 and corresponding descriptions. However, the second gNB 105c may reserve some random access channel (RACH) resources or RACH-like resources for the V2X operations of the first UE 110a in the event that the first UE 110a moves back into the coverage area 130c. Non-limiting examples of RACH-like resources may include SRB3, resources for connection setup signaling such as MSG1, MSG2, MSG3, or MSG3 during the RACH procedure, full RACH resources, partial RACH resources or other suitable NR uplink radio resources. In some examples, the second gNB 105c may inform the first UE 110a regarding the reserved resources via a tunneled NR-RRCReconfiguration message through the eNB 105a.

Still referring to FIG. 3, in some implementations, the first UE 110a may move back into the coverage area 130c. After entering the coverage area 130c, the first UE 110a may send one or more RRC messages (e.g., in SRB3) directly to the second gNB 105c to activate the NR radio interface link 135c via the reserved RACH-like resources to allow NR PC5 operations (e.g. NR PC5 BSR operations). Alternatively, the second gNB 105c may activate the reserved RACH-like resources based on an indication by the eNB 105a. For example, the eNB 105a may notify the second gNB 105c to activate the reserved resources based on measurement report and/or NR RRC signaling tunneled in LTE SRB1. The reserved resources may be allocated to the first UE 110a for obtaining configuration information and/or communicating with the second UE 110b.

Figure 4:
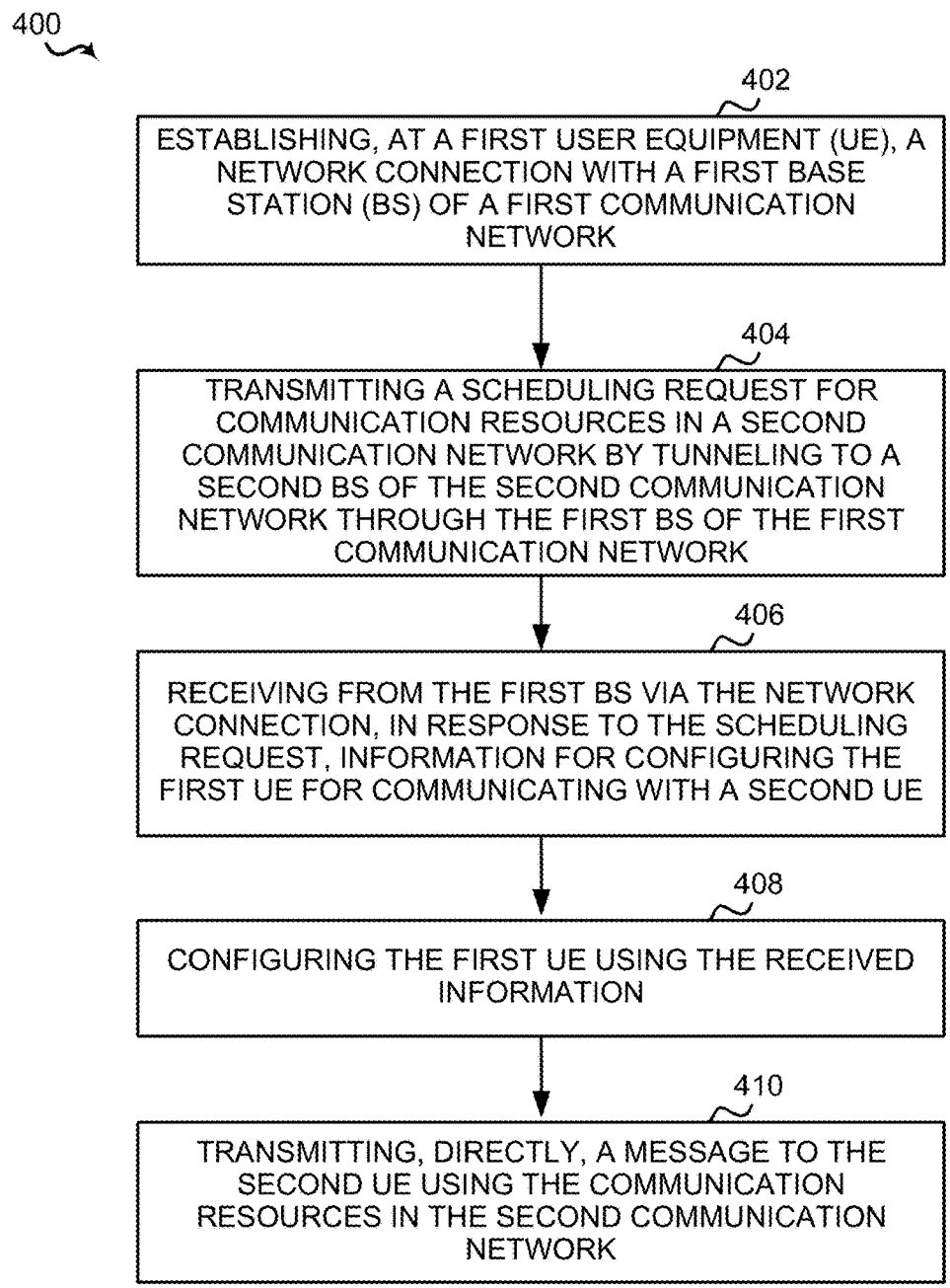
FIG. 4 is a flow chart of an example of a method of wireless communications by a UE, including at least a portion of the tunneling procedure.

Referring now to FIG. 4, the first UE 110a may perform an example of a method 400 of wireless communication, including at least a portion of the resource request via a tunneling procedure as described above. In one example, the first UE 110a may be a vehicle configured to communicate with the second UE 110b using a V2X communication interface. In certain examples, the method 400 may be used by the first UE 110a when the first UE 110a moves outside of the coverage area 130c. In some implementations, the method 400 does not consume over the air resources of the second gNB 105c for the V2X communication.

At block 402, the method 400 may establish, at a first UE, a network connection with a first BS of a first communication network. For example, the communication component 150 of the first UE 110a may establish, at the first UE 110a, a network connection with the eNB 105a of a LTE network. To establish a network connection with the eNB 105a, the first UE 110a may first send a preamble sequence to the eNB 105a. The preamble may be selected from a number of random access channel preambles. Next, the eNB 105a may respond with a random access response to the first UE 110a on the Downlink Shared Channel based on the Random Access Radio Network Temporary Identity (RA-RNTI) of the first UE 110a. The RA-RNTI of the first UE 110a may be derived from the time the first UE 110a sends the preamble. In the random access response, the eNB 105a may provide some or all of the following information: a Cell Radio Network Temporary Identity (C-RNTI), a timing advance value, or an uplink grant resource. Upon receiving the random access response, the first UE 110a may use the uplink grant resource to send a RRC connection request message, which includes an identity of the first UE 110a and/or a connection establishment cause. Next, the eNB 105a may provide a contention resolution message and establishes the network connection.

At block 404, the method 400 may transmit a scheduling request for communication resources in a second communication network by tunneling to a second BS of the second communication network through the first BS of the first communication network. For example, the communication component 150 of the first UE 110*a* and/or the transceiver 602 may transmit a scheduling request for communication resources in the NR network by tunneling to the second gNB 105*c* through the eNB 105*a* of the LTE network. In some implementations, the first UE 110*a* may move out of the coverage area 130*c* of the second gNB 105*c*, but still requires communication resources to initiate V2X communication with the second UE 110*b*. Therefore, if the eNB 105*a* includes dual connectivity, the first UE 110*a* may request communication resources from the second gNB 105*c* by tunneling through the eNB 105*a* (i.e. having the eNB 105*a* relay the request). For example, the tunneling procedure may include the first UE 110*a* sending the scheduling request for communication resources for the NR network to the eNB 105*a*. Next, the eNB 105*a* may forward the scheduling request to the second gNB 105*c* via the backhaul links 125. The tunneling procedure may allow the first UE 110*a* to obtain communication resources in the second communication network even though the first UE 110*a* is not currently within the coverage area 130*c* of the second gNB 105*c*.

At block 406, the method 400 may receive from the first BS via the network connection, in response to the scheduling request, information for configuring the first UE for communicating with a second UE. For example, the communication component 150 of the first UE 110*a* and/or the transceiver 602 may receive from the eNB 105*a* configuration information for NR PC5 V2X communication with the second UE 110*b*. The eNB 105*a* may first receive the configuration information from the second gNB 105*c* in response to forwarding the scheduling request. After receiving the configuration information, the eNB 105*a* may forward the configuration information to the first UE 110*a*.

At block 408, the method 400 may configure the first UE using the received information. For example, the configuration component 152 of the first UE 110*a* may configure the first UE 110*a* using the configuration information, such as NR V2X RNTI for normal TTI or URLLC and LCD mapping for normal TTI or URLLC. The configuration information may provide the first UE 110*a* with a network identity and inform the first UE 110*a* the allocated communication resources to use when communicating with the second UE 110*b*.

At block 410, the method 400 may transmit, directly, a message to the second UE using the communication resources in the second communication network. For example, the communication component 150 of the first UE 110*a* and/or the transceiver 602 may directly transmit V2X message to the second UE 110*b* via the V2X link 126. In some implementations, the V2X message is sent directly to the second UE 110*b* without going through the eNB 105*a* or the gNB second 105*c*.

Figure 5:
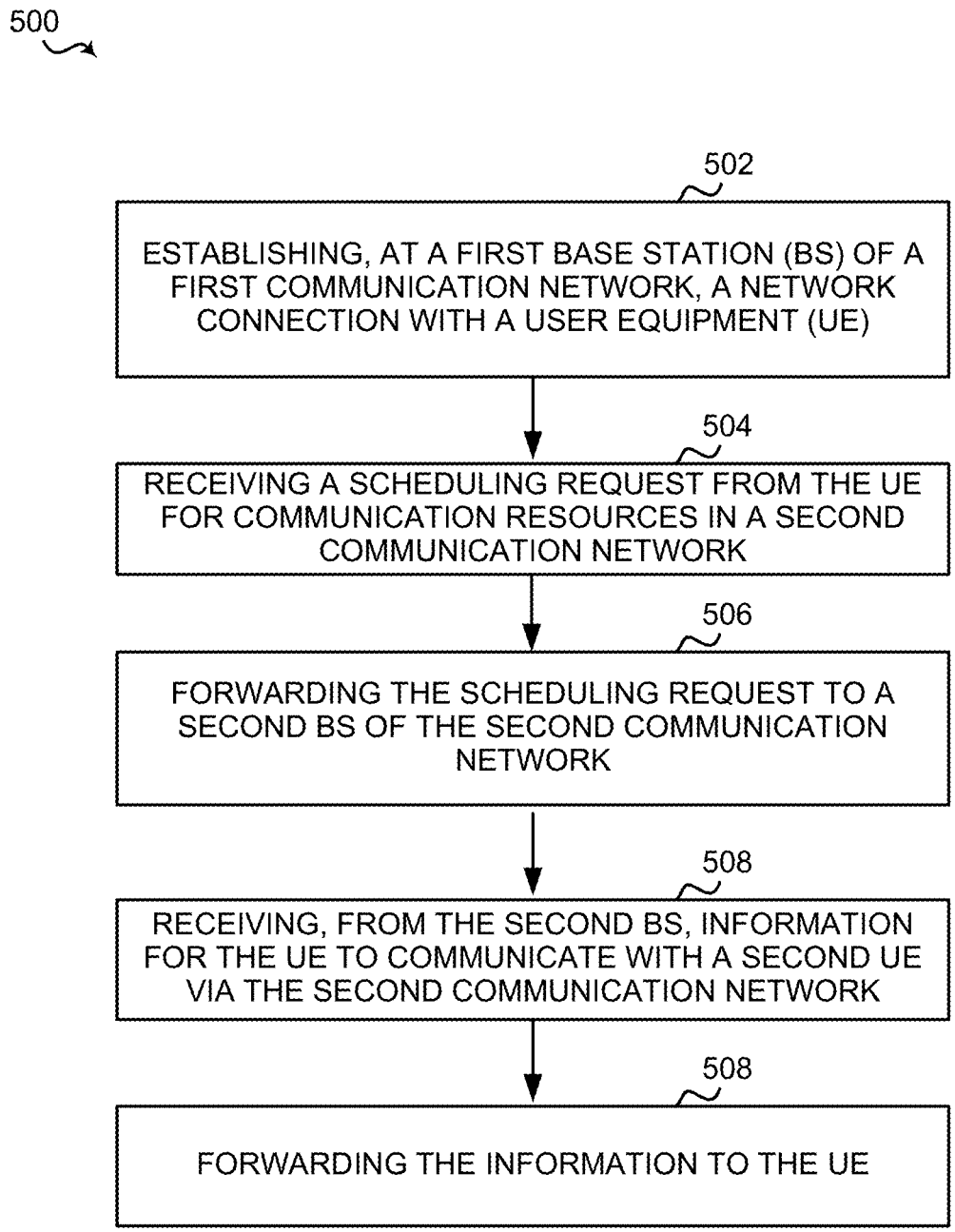
FIG. 5 is a flow chart of an example of a method of wireless communications by a BS, including at least a portion of the tunneling procedure.

Referring to FIG. 5, the eNB 105*a* may perform an example of a method 500 of wireless tunnel communication, including at least a portion of the tunneling procedure described above. In an example, eNB 105*a* may provide the first UE 110*a* an alternative for scheduling network resources when the first UE 110*a* does not have a network connection to the second gNB 105*c*.

At block 502, the method 500 may establish, at a first BS of a first communication network, a network connection with a UE. For example, the communication component 170 of the eNB 105*a* may establish a network connection with the first UE 110*a*. The process to establish a network connection is described above with respect to block 402 of FIG. 4, for example.

At block 504, the method 500 may receive a scheduling request from the UE for communication resources in a second communication network. For example, the communication component 170 of the eNB 105*a* and/or the transceiver 702 may receive a scheduling request from the first UE 110*a* for NR PC5 communication with the second UE 110*b* in the NR network.

At block 506, the method 500 may forward the scheduling request to a second BS of the second communication network. For example, the communication component 170 of the eNB 105*a* may forward the scheduling request to the second gNB 105*c* of the NR network. In some implementations, the eNB 105*a* may forward the scheduling request without processing the scheduling request. For example, the eNB 105*a* may forward the scheduling request without reading the content of scheduling request, decompressing the scheduling request, compressing the scheduling request, decoding the scheduling request, and/or encoding the scheduling request.

At block 508, the method 500 may receive, from the second BS, information for the UE to communicate with a second UE via the second communication network. For example, the communication component 170 of the eNB 105*a* and/or the transceiver 702 may receive, from the second gNB 105*c*, configuration information for NR PC5 V2X communication. The configuration information may provide the first UE 110*a* with a network identity and inform the first UE 110*a* communication resources to use in the second communication network when communicating with the second UE 110*b*.

At block 510, the method 500 may forward the information to the UE. For example, the communication component 170 of the eNB 105*a* may forward the information to the first UE 110*a*.

In optional implementations, the scheduling request may include resource requests for both LTE PC5 and NR PC5 communications. The message component 174 of the eNB 105*a* may generate a modified scheduling request that includes the NR PC5 resource request. The communication component 170 of the eNB 105*a* may forward the modified scheduling request to the second gNB 105*c*. In response, the communication component 170 of the eNB 105*a* may receive configuration information for NR PC5 from the second gNB 105*c*. Prior to forwarding the configuration information for NR PC5, the scheduling component 172 may first generate configuration information for LTE PC5. The message component 174 may combine the configuration information for NR PC5 and LTE PC5 into a combined message, and communication component 170 of the eNB 105*a* may transmit the combined message to the first UE 110*a*. Alternatively, the configuration information for NR PC5 and LTE PC5 may be transmitted separately to the first UE 110*a*.

Figure 6:
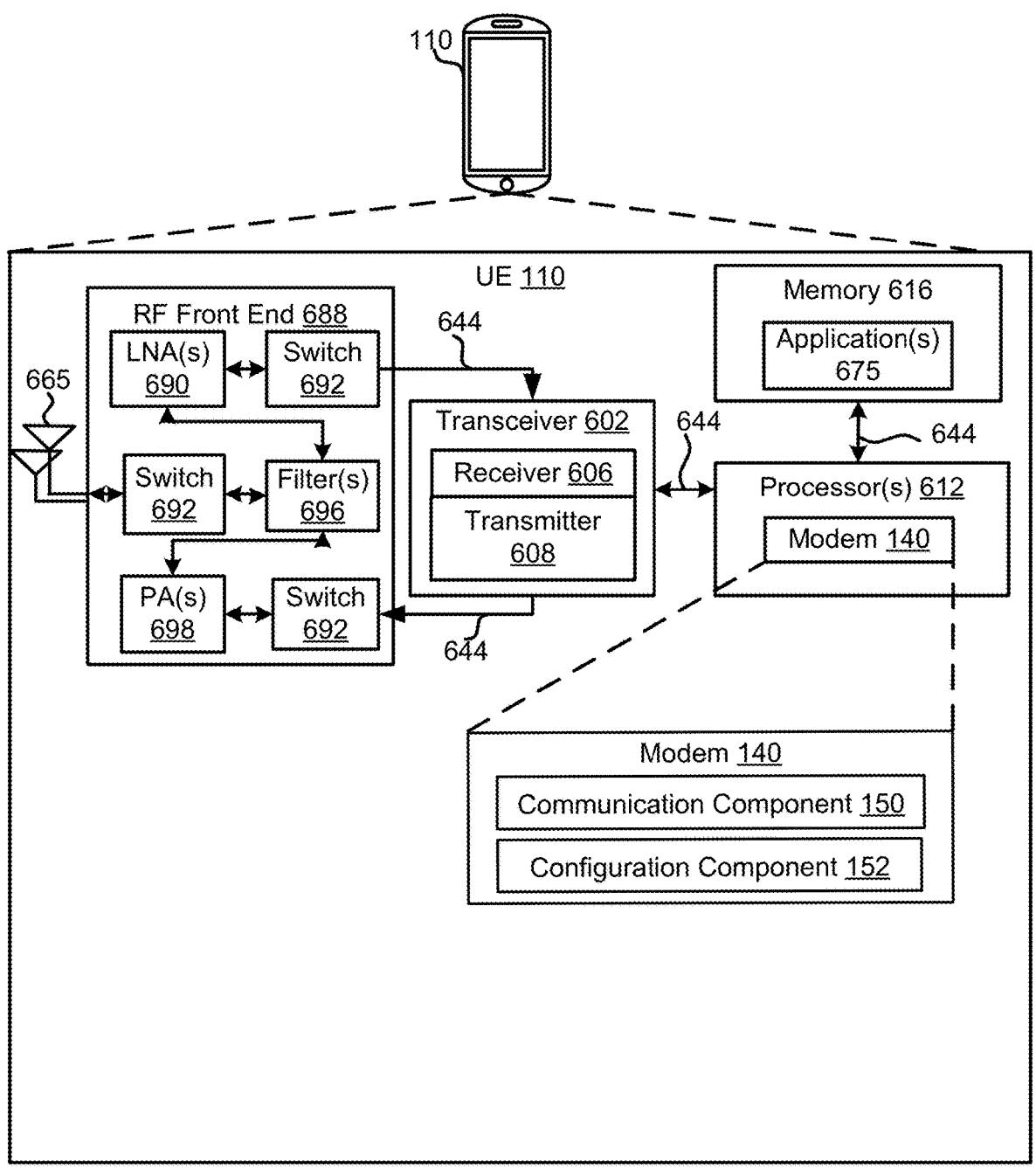
FIG. 6 is a schematic diagram of an example of a UE.

Referring to FIG. 6, one example of an implementation of the UE 110 may include a variety of components, some of which have already been described above, but including components such as one or more processors 612 and memory 616 and transceiver 602 in communication via one or more buses 644, which may operate in conjunction with the modem 140, the communication component 150 and the configuration component 152 to enable one or more of the functions described herein related to communicating with the BS 105. Further, the one or more processors 612, modem 140, memory 616, transceiver 602, RF front end 688 and one or more antennas 665, may be configured to support voice and/or data calls (simultaneously or non-simultaneously) in one or more radio access technologies.

In an aspect, the one or more processors 612 may include the modem 140 that uses one or more modem processors. The various functions related to the communication component 150 and the configuration component 152 may be included in modem 140 and/or processors 612 and, in an aspect, may be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. Additionally, the modem 140 may configure the UE 110 along with the configuration component 152 and the processors 612. In other aspects, some of the features of the one or more processors 612 and/or the modem 140 associated with the communication component 150 may be performed by transceiver 602.

Also, memory 616 may be configured to store data used herein and/or local versions of applications 675 or the communication component 150 and/or one or more subcomponents of the communication component 150 being executed by at least one processor 612. Memory 616 may include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining the communication component 154 and/or one or more of its subcomponents, and/or data associated therewith, when UE 110 is operating at least one processor 612 to execute the communication component 150 and the configuration component 152 and/or one or more of their subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by UE 110. RF front end 688 may be coupled with one or more antennas 665 and may include one or more low-noise amplifiers (LNAs) 690, one or more switches 692, one or more power amplifiers (PAs) 698, and one or more filters 696 for transmitting and receiving RF signals.

In an aspect, LNA 690 may amplify a received signal at a desired output level. In an aspect, each LNA 690 may have a specified minimum and maximum gain values. In an aspect, RF front end 688 may use one or more switches 692 to select a particular LNA 690 and the specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and the specified gain value based on a desired gain value for a particular application.

Also, for example, one or more filters 696 may be used by RF front end 688 to filter a received signal to obtain an input RF signal. Similarly, in an aspect, for example, a respective filter 696 may be used to filter an output from a respective PA 698 to produce an output signal for transmission. In an aspect, each filter 696 may be coupled with a specific LNA 690 and/or PA 698. In an aspect, RF front end 688 may use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 may communicate with, for example, one or more base stations 105 or one or more cells associated with one or more base stations 105. In an aspect, for example, the modem 140 may configure transceiver 602 to operate at a specified frequency and power level based on the UE configuration of the UE 110 and the communication protocol used by the modem 140.

In an aspect, the modem 140 may be a multiband-multimode modem, which may process digital data and communicate with transceiver 602 such that the digital data is sent and received using transceiver 602. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of UE 110 (e.g., RF front end 688, transceiver 602) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network during cell selection and/or cell reselection.

Figure 7:
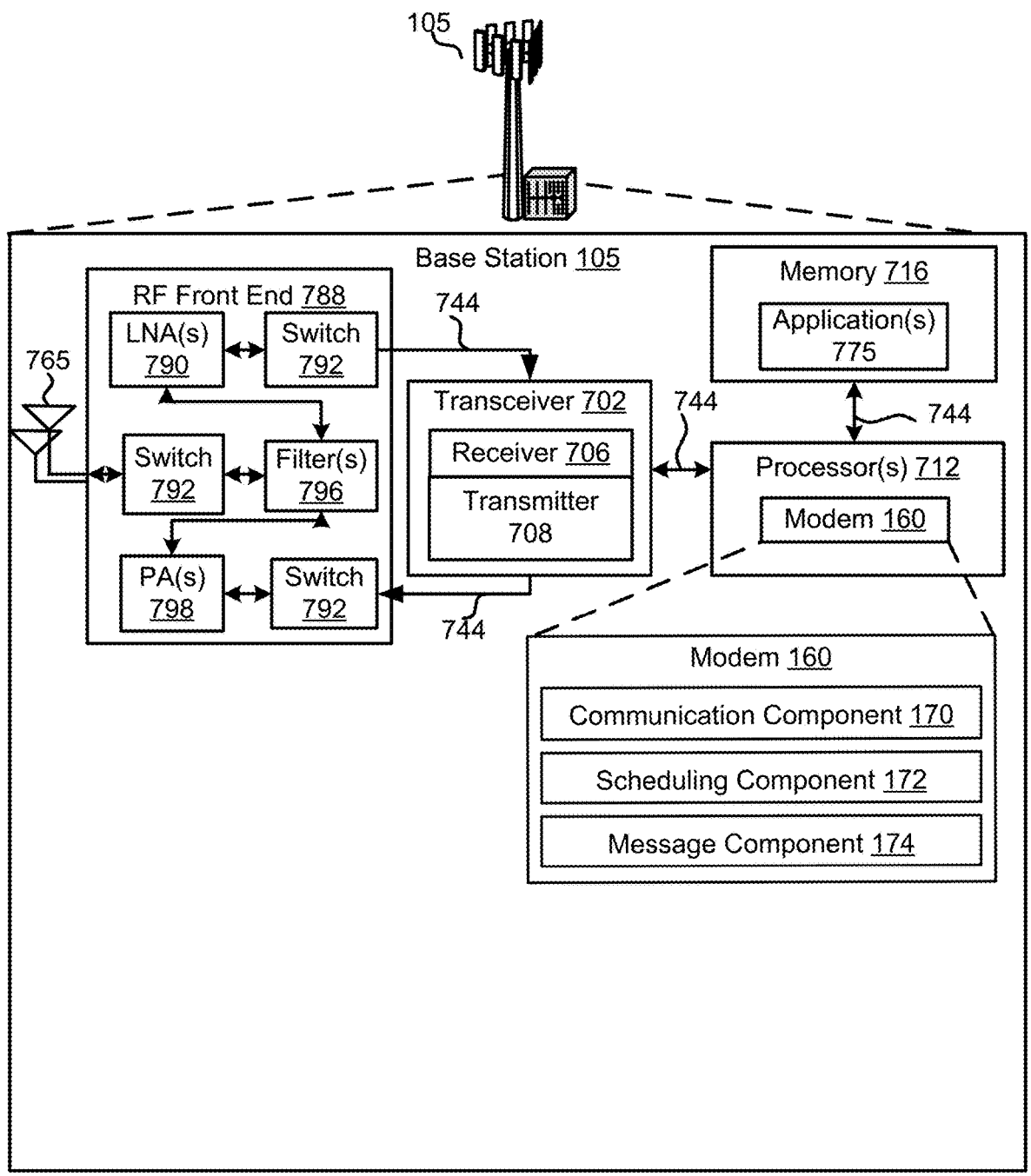
FIG. 7 is a schematic diagram of an example of a base station.

Referring to FIG. 7, one example of an implementation of base station 105 may include a variety of components, some of which have already been described above, but including components such as one or more processors 712 and memory 716 and transceiver 702 in communication via one or more buses 744, which may operate in conjunction with the modem 160, the communication component 170, the scheduling component 172, and the message component 174 to enable one or more of the functions described herein related to initialization of UEs 110. The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of the UE 110, as described above, but configured or otherwise programmed for base station operations as opposed to UE operations. For example, the communication component 170 may perform the tunneling procedure with the modem 160 and the processors 712.

Figure 8:
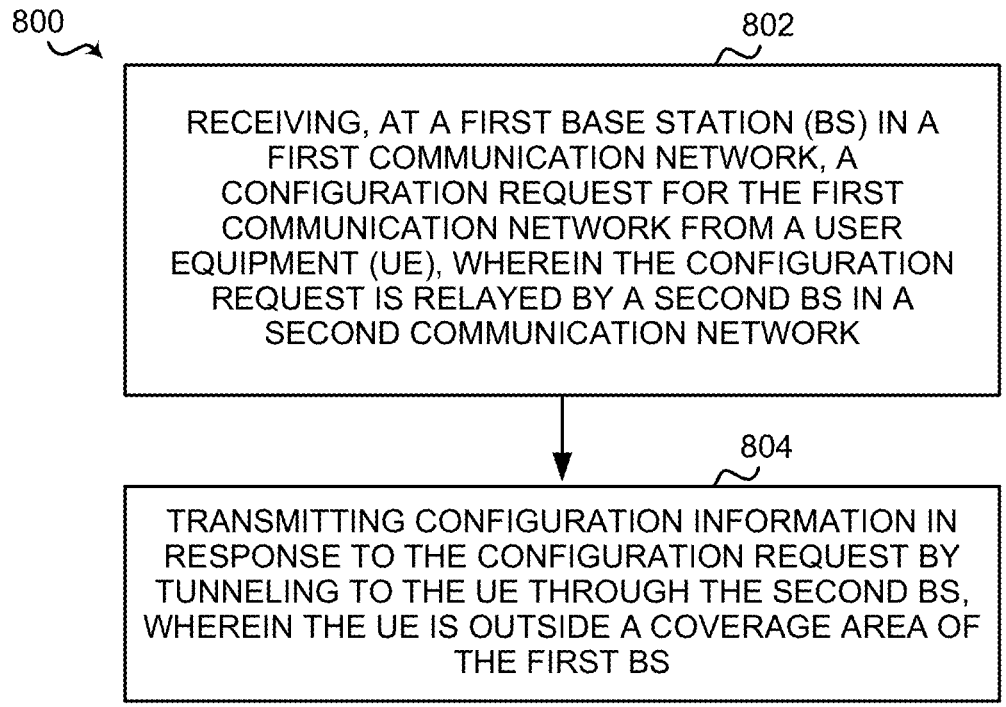
FIG. 8 is a flow chart of an example of a method of wireless communications by a BS, including at least a portion of the tunneling procedure.

Referring now to FIG. 8, the second gNB 105c may perform an example of a method 800 of wireless communications including at least a portion of the tunneling procedure. In an example, the second gNB 105c may provide the first UE 110a with configuration information without establishing a direct network connection to the first UE 110a.

At block 802, the method 800 may receive, at a first BS in a first communication network, a configuration request for the first communication network from a UE, wherein the configuration request is relayed by a second BS in a second communication network. For example, the communication component 170 of the second gNB 105c may receive a configuration request for NR PC5 communication relayed by the eNB 105a.

At block 804, the method 800 may transmit configuration information in response to the configuration request by tunneling to the UE through the second BS, wherein the UE is outside a coverage area of the first BS. For example, the communication component 170 of the second gNB 105c may transmit configuration information by tunneling to the first UE 110a through the eNB 105a.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
   establishing, at a first user equipment (UE), a network connection with a first base station (BS) of a first communication network using Long Term Evolution (LTE) for vehicle to everything (V2X) communications;
   receiving an indication from the first BS that the first BS supports communications with a second communication network that uses New Radio (NR) for V2X communications;
   transmitting, to the first BS, a NR Sidelink User Equipment Information (NR-SLUEInfo) request for communication resources in the second communication network by embedding the NR-SLUEinfo request in an LTE RRC message;
   receiving from the first BS via the network connection, in response to the request, information for configuring the first UE for communicating with a second UE; and
   transmitting, directly, a message to the second UE using the communication resources in the second communication network in accordance with the information for configuring the first UE.

2. The method of claim 1, further comprising:
   receiving, from the first BS, a notification indicating that the second BS allocated reserved network resources for the first UE;
   transmitting, upon entering a coverage area of the second BS, an activation message to the second BS using the allocated reserved network resources to activate a network connection with the second BS in the second communication network; and
   transmitting, directly, a scheduling request to the second BS to communicate with the second UE.

3. The method of claim 1, wherein the request for communications resources includes a request for a communication interface using a first communication network protocol or a second communication network protocol.

4. The method of claim 1, wherein:
   the request for communications resources includes a radio resource control information or a media access control information; and
   the information for configuring the first UE includes downlink control information.

5. The method of claim 4, wherein:
   the request for communications resources includes a request for at least one of a normal Transmission Time Interval (TTI) or a TTI for Ultra-Reliable Low-Latency Communication (URLLC); and
   the information includes, depending on the request for communications resources, at least one of a New Radio Vehicle-to-Everything Radio Network Temporary Identifier (NR V2X RNTI) for normal TTI or a NR V2X RNTI for URLLC.

6. The method of claim 1, wherein the first wireless communication technology is Long Term Evolution and the second wireless communication technology is 5G New Radio (NR).

7. A user equipment (UE), comprising:
   a memory;
   a transceiver; and
   one or more processors operatively coupled to the memory and the transceiver, the one or more processors being configured to:
   establish a network connection with a first base station (BS) of a first communication network using LTE for vehicle to everything (V2X) communications;
   receive an indication from the first BS that the first BS supports communications with a second communication network that uses NR for V2X communications;
   transmit, to the first BS via the transceiver, a NR Sidelink User Equipment Information (NR-SLUEInfo) request for communication resources in the second communication network by embedding the NR-SLUEInfo request in an LTE RRC message;
   receive, via the transceiver, from the first BS of the first communication network, in response to the request, information for configuring the UE for communicating with a second UE;
   and
   transmit, directly via the transceiver, a message to the second UE using the communication resources in the second communication network in accordance with the information for configuring the first UE.

8. The UE of claim 7, wherein the one or more processors are further configured to:
   receive from the first BS, via the transceiver, a notification indicating that the second BS allocated reserved network resources for the first UE;
   transmit, upon entering a coverage area of the second BS, via the transceiver, an activation message to the second BS using the allocated reserved network resources to activate a network connection with the second BS in the second communication network; and transmit, directly via the transceiver, a scheduling request to the second BS to communicate with the second UE.

9. The UE of claim 7, wherein the request for communications resources includes a request for a communication interface using a first communication network protocol or a second communication network protocol.

10. The UE of claim 7, wherein:
the request for communications resources includes a radio resource control information or a media access control information; and
the information for configuring the first UE includes downlink control information.

11. The UE of claim 10, wherein:
the request for communications resources includes a request for at least one of a normal Transmission Time Interval (TTI) or a TTI for Ultra-Reliable Low-Latency Communication (URLLC); and
the information includes, depending on the request for communications resources, at least one of a New Radio Vehicle-to-Everything Radio Network Temporary Identifier (NR V2X RNTI) for normal TTI or a NR V2X RNTI for URLLC.

12. The UE of claim 7, wherein the first wireless communication technology is communication technology is Long Term Evolution and the second wireless communication technology is 5G New Radio (NR).

13. A non-transitory computer-readable medium having instructions stored therein that, when executed by one or more processors of a user equipment (UE), cause the one or more processors to:
establish a network connection with a first base station (BS) of a first communication network using Long Term Evolution (LTE) for vehicle to everything (V2X) communications;
receive an indication from the first BS that the first BS supports communications with a second communication network that uses New Radio (NR) for V2X communications;
transmit, to the first BS, a NR Sidelink User Equipment Information (NR-SLUEInfo) request for communication resources in the second communication network by embedding the NR-SLUEinfo request in an LTE RRC message;
receive from the first BS of the first communication network, in response to the request, information for configuring the UE for communicating with a second UE;
and
transmit, directly, a message to the second UE using the communication resources in the second communication network in accordance with the information for configuring the first UE.

14. The computer-readable medium of claim 13, further comprising instructions that, when executed by the one or more processors of the UE, cause the one or more processors to:
receive, from the first BS, a notification indicating that the second BS allocated reserved network resources for the first UE;
transmit, upon entering a coverage area of the second BS, an activation message to the second BS using the allocated reserved network resources to activate a network connection with the second BS in the second communication network; and
transmit, directly, a scheduling request to the second BS to communicate with the second UE.

15. The computer-readable medium of claim 13, wherein the request for communications resources includes a request for a communication interface using a first communication network protocol or a second communication network protocol.

16. The computer-readable medium of claim 13, wherein:
the request includes a radio resource control information or a media access control information; and
the information for configuring the first UE includes downlink control information.

17. The computer-readable medium of claim 16, wherein:
the request for communications resources includes a request for at least one of a normal Transmission Time Interval (TTI) or a TTI for Ultra-Reliable Low-Latency Communication (URLLC); and
the information includes, depending on the scheduling request, at least one of a New Radio Vehicle-to-Everything Radio Network Temporary Identifier (NR V2X RNTI) for normal TTI or a NR V2X RNTI for URLLC.

18. The computer-readable medium of claim 13, wherein the first wireless communication technology is Long Term Evolution (LTE) and the second wireless communication technology is 5G New Radio (NR).

19. A method of wireless tunnel communication, comprising:
establishing, at a first base station (BS) of a first communication network that uses Long Term Evolution (LTE) for vehicle to everything (V2X) communications, a network connection with a user equipment (UE);
transmitting an indication from the first BS to the UE that the first BS supports communications with a second communication network that uses New Radio (NR) for V2X communications;
receiving from the UE an LTE RRC message, wherein a New Radio Sidelink User Equipment Information (NR-SLUEInfo) request for communication resources in the second communication network is embedded in the LTE RRC message;
forwarding the NR-SLUEInfo request to a second BS of the second communication network;
receiving, from the second BS, information for the UE to communicate with a second UE via the second communication network; and
forwarding the information to the UE.

20. The method of claim 19, wherein:
the request for communications resources includes at least one of radio resource control information or a media access control information; and
the information for the UE includes downlink control information.

21. The method of claim 20, wherein:
the request for communications resources includes a request for at least one of a normal Transmission Time Interval (TTI) or a TTI for Ultra-Reliable Low-Latency Communication (URLLC); and
the information includes, depending on the request for communications resources, at least one of a New Radio Vehicle-to-Everything Radio Network Temporary Identifier (NR V2X RNTI) for normal TTI or a NR V2X RNTI for URLLC.

22. The method of claim 19, wherein the request for communications resources includes a request for a communication interface using a first communication network protocol or a second communication network protocol.

23. The method of claim 19, further comprising transmitting, to the UE, downlink control information indicating scheduling assignment resource locations via a Physical Downlink Control Channel.

24. The method of claim 19, wherein the first wireless communication technology is Long Term Evolution (LTE) and the second wireless communication technology is 5G New Radio (NR).

25. A base station (BS), comprising:
   a memory;
   a transceiver; and
   one or more processors operatively coupled to the memory and the transceiver, the one or more processors being configured to:
      establish, at the BS of a first communication network using Long Term Evolution (LTE) for vehicle to everything (V2X) communications, a network connection with a user equipment (UE);
      transmit an indication from the BS to the UE that the BS supports communications with a second communication network that uses New Radio (NR) for V2X communications;
      receive, via the transceiver, from the UE an LTE RRC message, wherein a New Radio Sidelink User Equipment Information (NR-SLUEInfo) request for communication resources in the second communication network is embedded in the LTE RRC message;
      forward the NR-SLUEInfo request to a second BS of the second communication network;
      receive from the second BS, via the transceiver, information for the UE to communicate with a second UE via the second communication network; and
      forward the information to the UE.

26. The base station of claim 25, wherein:
   the request for communication resources includes at least one of radio resource control information or a media access control information; and
   the information for the UE includes downlink control information.

27. The base station of claim 26, wherein:
   the request for communication resources includes a request for at least one of a normal Transmission Time Interval (TTI) or a TTI for Ultra-Reliable Low-Latency Communication (URLLC); and
   the information includes, depending on the request for communication resources, at least one of a New Radio Vehicle-to-Everything Radio Network Temporary Identifier (NR V2X RNTI) for normal TTI or a NR V2X RNTI for URLLC.

28. The base station of claim 25, wherein the request for communication resources includes a request for a communication interface using a first communication network protocol or a second communication network protocol.

29. The base station of claim 25, wherein the one or more processors are further configured to transmit, to the UE, downlink control information indicating scheduling assignment resource locations via a Physical Downlink Control Channel.

30. The base station of claim 25, wherein the first wireless communication technology is Long Term Evolution (LTE) and the second wireless communication network technology is a New Radio (NR).

31. A non-transitory computer-readable medium having instructions stored therein that, when executed by one or more processors of a base station (BS), cause the one or more processors to:
   establish, at the BS of a first communication network using Long Term Evolution (LTE) for vehicle to everything (V2X) communications, a network connection with a user equipment (UE);
   transmit an indication from the BS to the UE that the BS supports communications with a second communication network that uses New Radio (NR) for V2X communications;
   receive from the UE an LTE RRC message, wherein a New Radio Sidelink User Equipment Information (NR-SLUEInfo) request for communication resources in the second communication network is embedded in the LTE RRC message;
   forward the NR-SLUEInfo request to a second BS of the second communication network;
   receive, from the second BS, information for the UE to communicate with a second UE via the second communication network; and
   forward the information to the UE.

32. The computer-readable medium of claim 31, wherein:
   the request for communication resources includes at least one of radio resource control information or a media access control information; and
   the information for the UE includes downlink control information.

33. The computer-readable medium of claim 32, wherein:
   the request for communication resources includes a request for at least one of a normal Transmission Time Interval (TTI) or a TTI for Ultra-Reliable Low-Latency Communication (URLLC); and
   the information includes, depending on the request for communication resources, at least one of a New Radio Vehicle-to-Everything Radio Network Temporary Identifier (NR V2X RNTI) for normal TTI or a NR V2X RNTI for URLLC.

34. The computer-readable medium of claim 31, wherein the request for communication resources includes a request for a communication interface using a first communication network protocol or a second communication network protocol.

35. The computer-readable medium of claim 31, further comprising instructions that, when executed by the one or more processors of the BS, cause the one or more processors to transmit, to the UE, downlink control information indicating scheduling assignment resource locations via a Physical Downlink Control Channel.

36. The computer-readable medium of claim 31, wherein the first wireless communication technology is Long Term Evolution (LTE) and the second wireless communication technology is New Radio (NR).

* * * * *